United States Patent Office 3,275,098
Patented Sept. 27, 1966

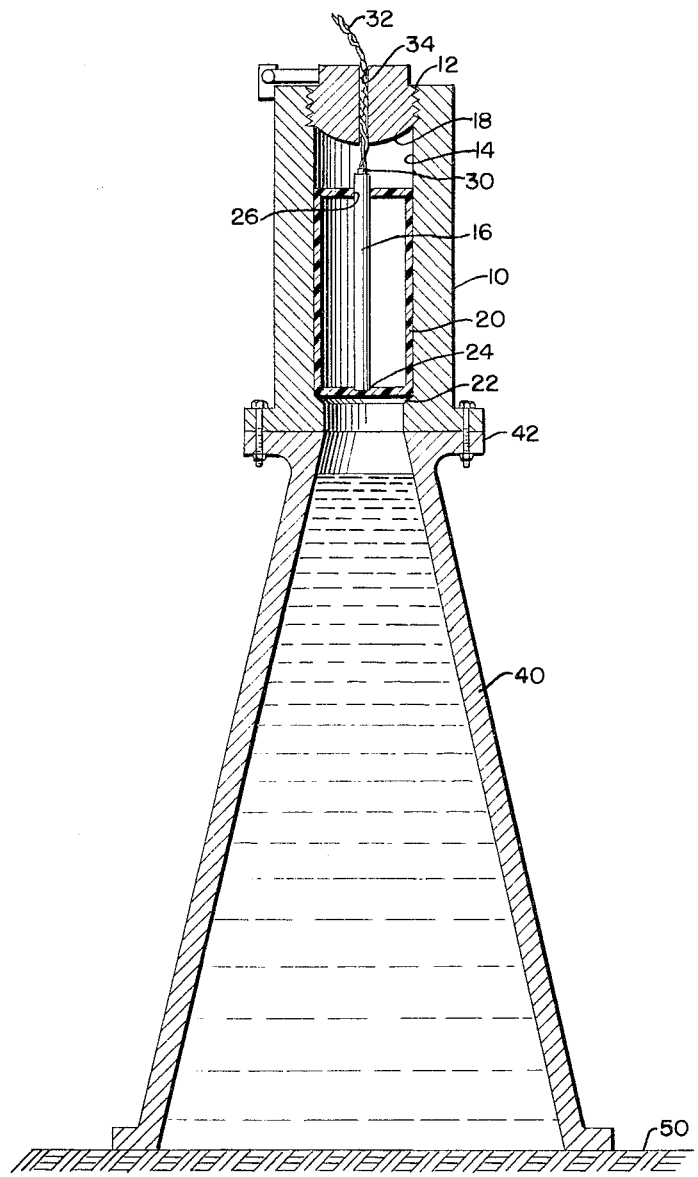
INVENTOR.
WILLIAM S. FILLER

3,275,098
METHOD AND APPARATUS FOR GENERATING SEISMIC WAVES
William S. Filler, 302 Bradley Ave., Rockville, Md.
Filed Dec. 27, 1960, Ser. No. 78,701
7 Claims. (Cl. 181—.5)

The instant invention relates to geophysical exploration and pertains specifically to an apparatus and method for generating the shock waves employed for seismic prospecting techniques.

The entire art of seismic surveying is based upon generation of waves in the earth's crust and detecting, recording and interpreting the waves which are reflected or refracted back to the surface from strata inter-faces and the like. Generation of the wave is effected commonly by detonating a suitable explosive above ground level, at ground level, or beneath ground level. The above ground level explosion or shot has the advantage of simplicity, but has the disadvantage of transmitting to the ground a relatively low intensity shock wave. Also the noise of the explosion may be objectionable in populated areas. Ground level shots have the objection of generating excessive amounts of undesired surface or near surface seismic waves traveling substantially horizontally to the points of wave detection. Sub-surface shots, customarily placed below the weathering layer have the substantial and obvious disadvantage of requiring that a shot hole be drilled.

The improvement of the instant invention is principally but not exclusively applicable to ground level shots.

One of the problems facing the art has been the desire, indeed a need, to provide seismic waves which can be easily detected and identified despite the clutter and noise also picked up by the geophones. One approach made by the art to this specific problem involves an effort to directionalize the seismic wave downwardly to decrease relatively the undesired horizontal wave energy produced and increase relatively the wave energy propagated downwardly into the earth's crust reflecting strata inter-faces. One suggested technique involves initiating the seismic shock by detonating simultaneously a plurality of explosive charges positioned just above the earth's surface, say about 6–10 feet above ground level. The charges normally are arranged in symmetrical patterns such as hexagons, star-shapes, and the like. Such a method has been described by T. C. Poulter in Geophysics, vol. 15, page 18 (April 1950), and in Poulter Patent No. 2,545,380.

Comparable suggestions for spacing apart subsurface explosive charges have also been made, e.g. U.S. Patents Nos. 2,730,187 and 2,908,342.

The instant invention may be considered an improvement over such directionalizing in its provision of a high degree of directionality for the shock wave originating from a single detonation.

In air, or ground level shots, a specific problem facing the art is the desirability of transmitting reasonably sharp shock waves to the earth's crust. The difficulties are accentuated by reflection interference, rapid attenuation, etc., which occur as the shock wave travels through the air and the weathering layer. While large explosive charges can readily be employed for air and ground level shocks, there are practical limits to the quantity of explosive which can be detonated in one shot. As a result the art has been limited in the ability to apply a concentrated high intensity shock directly at the earth's crust.

The instant invention is intended to provide both an apparatus and a method for generating and applying to a sharply restricted region of the earth's surface a controlled supersonic shock wave of very great amplitude in terms of the quantity of high explosive used.

The practice of the instant invention may perhaps be best understood by considering what occurs in an air shot and by comparison of the instant invention therewith. Thus when an explosion takes place in the air, the shock wave expands spherically outward from the detonation point. For seismic results the skyward half of the expanding spherical shock wave is obviously a complete waste. Even a large portion of the earthward half of the spherical wave is of dubious value for seismic work. Essentially the explosion may be considered uncontrolled.

Virtually the same may be said about the nature of any one ground level shot, underwater shot, or underground shot; namely an uncontrolled explosion in which there results a complete waste of at least the upwardly directed half of the explosive energy. A substantial portion of the downward half of explosive shock wave is directed away from the reflecting strata inter-faces. Indeed some portions of the misdirected shock wave are the cause of the wave forms which confuse and obscure the desired information on the seismic records.

The principal object of the instant invention is to provide both a technique and an apparatus for generating a controlled supersonic high energy shock wave and for applying same to the earth's crust in a concentrated and directed form.

While the term uncontrolled has been broadly applied above to designate free explosions, strictly speaking uncontrolled explosions are those not confined to a firing chamber and whose blast wave is not directed out through a shock tube. That is, to explosions which are not controlled according to the practice of the instant invention.

The basic phenomena involved in the instant invention is that underlying the recently discovered technique for controlling the magnitude and direction of the blast wave from any fixed amount of high explosive. When an explosive charge is detonated at the apex of a cone the resulting shock wave expands within the confines of the cone in much the same manner as if the shock wave were the corresponding conical sector of the full spherical shock wave expanding from a larger uncontrolled explosion.

In brief, the blast from the explosive is confined to a small sector of a sphere by containing the explosive at the apex of a hollow metallic cone of suitable wall thickness and permitting the blast wave to expand only within the confines of its conical path. The impact strength of the blast wave on an object positioned in the cone may be many orders of magnitude greater than is available from the same quantity of explosive fired in an unconfined space. The amplifying effects of a cone of angle $\theta$ with a quantity of explosive $w$ fired at the apex, will result in a shock wave propagating down the cone with pressure and duration characteristics, essentially those of a weight of charge $W$ defined by the expression $$W = \frac{2kw}{1-\cos\theta/2}$$

where $k$ is an efficiency factor varying from 0.3 to 0.6 depending on the cone design.

For a more detailed description of the blast wave in conical shock tubes and the construction of such tubes reference is hereby made to copending application for Explosive Driven Conical Shock Tube, S.N. 78,794 filed December 27, 1960, now Patent No. 3,184,955, and to the following published reports of the experimental work which relate to the instant invention and that of the above mentioned application: "Measurements on the Blast Wave in a Conical Tube", volume 3, Number 3 (May–June 1960), The Physics of Fluids, pages 444–448; and to "Design Characteristics of a Conical Shock Tube for the Simulation of Very Large Charge Blasts," NAVORD Report 6844, published October 1960 by the U.S. Naval Ordnance Laboratory, White Oak, Maryland.

If such a conical tube were positioned with its open end directed towards the earth's crust a shock wave of known pressure-time characteristics can be sent into the earth's crust. Furthermore, the shock wave will propagate through the crust with maximum amplitude along the direction of the axis of the cone. This will greatly reduce the amount of explosive required for a given strength seismic wave as well as minimize the strength of the spurious signals propagating horizontally to the geophone pick-ups. The quantitative and qualitative effects possible from practice of the instant invention can be illustrated by the exemplary instance of detonation in a 10° cone. Detonation of a 1 pound high explosive charge creates a shock wave which strikes the ground area subtended by the cone opening with nearly the force created by detonating 100 pounds of the same high explosive at the same point, but in an uncontrolled manner.

For the practice of the instant invention, however, certain limiting features exist. First of all the detonation must be effected with what is known as a high explosive. This is largely because only the extremely high reaction wave propagation rates of high explosives (e.g. 15,000–20,000 ft. per second) are able to produce shock waves with the desired characteristics. Exemplary high explosives are dynamite, Pentolite (a 50/50 mixture of trinitrotoluene and penta-erythrital tetranitrate), pressed trinitrotoluene, etc. Lower velocity explosives like gun cotton, gun powder, explosive gas mixtures, etc. materials which can more accurately be termed propellants are not contemplated except for the special circumstances where detonation of such propellant is so arranged that a controlled high explosive shock wave results. Thus the supersonic shock wave employed for the practice of the instant invention is characterized by a shock front pressure rise of less than one microsecond and whose characteristics are unaffected by the quantity of explosive or mode of ignition.

Thus the practice of the instant invention is not comparable for example to what happens if a gun blast (or even a cannon blast) were directed into the ground. Nor even to efforts such as suggested in Patent No. 2,772,746 and No. 2,766,837 to apply the blast energy of exploding gasses to the earth's crust. Compared to the practice of the instant invention the combustion wave of exploding propellants is too low in intensity, or uncontrolled or both; and may be subsonic and not a shock wave.

The practice of the instant invention requires an energy release region; i.e., a firing chamber, opening only into the shock tube. The blast wave generated in the firing chamber is directed out through the generally tubular path provided by the shock tube.

Employment of a shock tube to so direct the supersonic blast wave has the advantages of making the wave controllable both in magnitude and character. Thus, for example, a shock tube of conical shape is ordinarily preferred precisely because the supersonic blast or shock wave it produces so nearly duplicates the spherically expanding shock wave of an uncontrolled explosion. However, a cylindrical tube or even a converging cone can be employed instead of the expanding cone, and use of such shapes is contemplated within the scope of the instant invention. Shock tubes with a geometry other than the expanding cone change the shape and duration of the supersonic shock wave through wall effects. As a result the reflected waves received by the seismic instrument would be somewhat different from those of the presently recognized uncontrolled explosion. Thus some control over the shock wave is obtainable through the geometry of the shock tube. For clarity however the discussion on other techniques of controlling the shock wave will be with reference to the conical shock tube, but it should be understood that various control features and possible variations in utilization of the shock tube hereinafter given are as applicable to the cylindrical and the reverse cone shock tubes.

The principal control over the shock wave is, of course, through predetermination of the energy input, namely the weight of the explosive charge. Shock tubes may be constructed for explosive charges weighing less than one gram or exceeding one pound.

Still another way to vary the peak pressure of the shock wave impinging on the earth's crust is by variation in the cone angle ($\theta$) and, or alternatively, the cone length.

Still another substantial control over the character of the shock wave can be effected by changing the medium inside the cone. For ordinary ground level shocks the cone would customarily be positioned with its outlet in direct contact with the ground, the cone itself being filled with air or other gaseous medium. The blast wave strikes the ground subtended by the cone with essentially the wave form of an uncontrolled air explosion. However, the same cone can be employed with a flexible water impervious diaphragm across the mouth of the cone and with the cone full of water. This causes the supersonic shock wave to exhibit all the characteristics of an underwater explosion; i.e. higher shock pressure, shorter amplitude. In passing it should be noted how well adapted the instant invention is for underwater shots. The presence of water or any other fluid medium or even of a solid medium outside of the cone fails to alter the amplification and the controlled characteristics of the blast wave. For shots with a water filled cone it is necessary to provide a cone wall thickness great enough to minimize radial elastic expansion of the cone wall and prevent a resulting dissipation of the shock wave energy. Effectively a thicker walled cone must be employed for water shots than is necessary for shots with an air filled cone.

In any event, the actual construction of the cone can be varied for particular applications in virtually any predetermined fashion. Essentially, design and fabrication of the shock tube and firing chamber are well within the capability of workers in the weapons art. Thus, a proper thickness for the cone wall can be calculated on the basis of strength requirements needed to withstand the known peak pressures of the blast developed within the cone by the dynamite or other high explosive for whatever amount used. Peak pressures of the shock wave in the cone may be determined through the combined use of standard shock pressure-distance data, the weight scaling laws for high explosives and the cone amplification equation mentioned earlier.

For the firing chamber, if desired, obsolete artillery pieces may be converted to the practice of the instant invention. Actually the energy-release, or firing chamber, is what receives the greatest blast shock. While the construction of preferred firing blocks for repetitive use will vary depending on the specific application, cylindrical construction for the firing chamber and use of a solid cylindrically shaped explosive charge appear preferred. Then significant plastic deformation of the firing block will not occur if a chamber diameter at least three times the explosive charge diameter is employed; preferably the diameter ratio should be about six to one to avoid any plastic deformation of the firing chamber wall. Also the outer diameter of the firing block should be about 10 to 15 charge diameters or more to be adequate for repeated firing. The explosive charge itself must, of course, be supported in spaced apart relation from the inside wall of the firing block with only a bare minimum of material between the explosive and the firing block wall. In practice thin styrofoam rings have been found suitable for supporting and spacing purposes.

While the entrance to the shock tube constitutes the only real path for the blast wave to exit from the firing chamber, there is no special geometric relationship between the exit of the firing chamber and the entrance to the shock tube. Specifially, there is no need to make the firing chamber a geometric extension of the cone. The firing chamber may be cylindrical as preferred, or square or any other suitable shape. It may even be larger than the attached apex end of a conical shock tube. Regardless of the actual configuration of the explosive charge and the configuration of the firing chamber, the blast forms itself into the characteristic expanding spherical shock wave by the time it is well inside the shock tube. Once inside the shock tube and confined therein, the blast shock takes on the wave form dictated by the geometry of the shock tube, being of course, the sector of a sphere for a conical shock tube.

Certain characteristics of a controlled blast wave from the shock tube have no real parallel with the blast of an uncontrolled explosion. Thus it is well known that the supersonic shock wave from an air explosion is largely reflected from the ground. Only a portion of the blast energy is actually transmitted to the earth's crust. However, when an air shot is effected at the apex of the conical shock tube, the reflected shock wave travels back up the cone to the apex. A second wave then propagates down the cone striking the earth to produce a second seismic wave and a second reflection. This process will be repeated until the explosive energy has been completely dissipated. Increasing the cone length will increase the duration of the shock wave striking the earth as well as the length of time between successive waves. In this fashion control can be exercised over the dominant frequency of the seismic wave transmitted into the earth.

Compared to an uncontrolled explosion, employing the blast wave from a shock tube according to the practice of the instant invention has certain other unique advantages. Crushing and compacting of the earth adjacent to the explosive charge so usual to ground level or underground seismic shots is largely avoided since the shocks actually striking the earth have lower peak pressures and the wave has already been spread out in space and time. This reduces energy losses and tends to produce a frequency more suitable for seismic purposes. Nor is the earth's surface disturbed to any significant degree. None of the noise or blast wave hazards common to open air shots result from employment of the shock tube particularly because relatively small quantities of explosives are used in the firing chamber, and the blast wave is entirely confined within the cone. Also, of course, there is virtually a complete absence of the misdirected blast wave portions which cause spurious reflections from the earth's surface and other disturbances to confuse and obscure the desired information recorded by the geophones.

For further understanding of the instant invention, reference is now made to the attached drawing illustrating diagrammatically the firing chamber and conical shock tube and which will be described in terms of an exemplary embodiment of the instant invention.

The firing block 10 illustrated in the drawing (conveniently adapted for a 1 pound explosive charge) is the powder chamber portion of a five inch naval rifle (1917 vintage). The interrupted screw thread breach mechanism 12, provides for free and easy access to the firing chamber 14 capable of withstanding the generated blast pressures if a reasonable spacing (e.g. at least one charge diameter) is maintained between the high explosive charge 16 and the breach block mushroom 18.

Inside firing chamber 14, the high explosive charge 16 is supported and spaced from the chamber walls by a cylindrical supporting member 20 (Styrofoam). Supporting member 20 sits on the shoulder 22 formed by the start of the rifle portion of the gun barrel. In turn the high explosive charge sits in a central recess 24 in the bottom of supporting member 20. A central opening 26 at the top of supporting member 20 helps center explosive charge 16.

Electric detonator 30 is positioned inside the top end of explosive charge 16, and, conveniently, detonator wires 32 are brought outside firing block 10 through the fuse hole 34.

The firing block 10 rests on a (8 ft. high) 10° conical shock tube 40, the two being joined at a centering and clamping flange 42. The shock tube 40 sits directly on the ground 50. In other modes, e.g. for water shots, the shock tube and firing block would be suspended from above.

One pound high explosive charges (Pentolite) can be repetitively detonated in this assembly. The blast wave resulting from detonation of the explosive charge impacts ground 50 with a concentrated directed supersonic blast wave.

It will be obvious to those skilled in the art that various changes may be made without departing from the spirit of the invention and therefore the invention is not limited to what is shown in the drawings and described in the specification but only as indicated in the appended claims.

What is claimed is:

1. A method for transmitting a directed concentrated shock wave to the ground which comprises, detonating a substantial quantity of high explosive in an energy release region, said region being confined in all directions save one exit area, said energy release region being several times the volume of the high explosive generating thereby a supersonic shock wave, passing the shock wave along a generally tubular path commencing at the exit area of said energy release region, and transmitting the shock wave to the ground from the terminus of said tubular path, the tubular path having previously been positioned relative to the ground so that the shock wave issuing therefrom is transmitted to the ground, and wherein the energy is released by detonation of a high explosive charge suspended in spaced apart relation to the confining bounds of said energy release region.

2. An apparatus for transmitting a directed supersonic shock wave to the ground which comprises, a firing chamber adapted to contain a high explosive charge in spaced apart relation from the chamber walls and, a shock tube connected at one end to said firing chamber and directed toward the ground, the other end terminating at about ground level.

3. The apparatus of claim 2 wherein a high explosive charge is present in said firing chamber and spacing means associated therewith space the charge from the firing chamber walls at least 3 charge diameters.

4. The apparatus of claim 3 wherein the shock tube is filled with a liquid.

5. The apparatus of claim 3 wherein the shock tube constitutes a conical structure flaring outwardly from an apex end connected to the firing chamber.

6. An apparatus for transmitting a directed shock wave to the ground which comprises, a firing chamber, a high explosive charge in said firing chamber spaced apart from the chamber walls and, a shock tube connected at one end to said energy release chamber and directed toward the ground, the shock tube having at least the ground end immersed in a body of water whereby the explosive shock wave leaving the shock tube is transmitted through the water to the ground.

7. The apparatus of claim 6 wherein the shock tube constitutes a conical structure flaring outwardly from the end connected to the energy release chamber.

(References on following page)

References Cited by the Examiner

UNITED STATES PATENTS

| | | | |
|---|---|---|---|
| 1,500,243 | 7/1924 | Hammond | 340—12 |
| 2,203,140 | 6/1940 | Green | 181—.5 |
| 2,407,093 | 9/1946 | Mohaupt. | |
| 2,605,703 | 8/1952 | Lawson | 102—24 |
| 2,628,559 | 2/1953 | Jasse | 102—24 |
| 2,649,046 | 8/1953 | Davis | 102—20 |
| 2,717,656 | 9/1955 | Bannister | 181—.5 |
| 2,772,746 | 12/1956 | Merten | 181—0.5 |
| 2,923,204 | 2/1960 | Mohaupt | 89—1.02 |

FOREIGN PATENTS 587,257  4/1947  Great Britain.

BENJAMIN A. BORCHELT, *Primary Examiner.*

CARL W. ROBINSON, CHESTER L. JUSTUS,
*Examiners.*

A. S. ALPERT, J. W. MILLS, W. KUJAWA,
*Assistant Examiners.*